(12) United States Patent
Schwab et al.

(10) Patent No.: US 9,791,289 B2
(45) Date of Patent: Oct. 17, 2017

(54) METHOD AND DEVICE FOR OPERATING A HEAD-UP DISPLAY FOR A VEHICLE

(71) Applicant: Bayerische Motoren Werke Aktiengesellschaft, Munich (DE)

(72) Inventors: Axel Schwab, Munich (DE); Christof Schulze, Munich (DE)

(73) Assignee: Bayerische Motoren Werke Aktiengesellschaft, Minuch (DE)

( * ) Notice: Subject to any disclaimer, the term of this patent is extended or adjusted under 35 U.S.C. 154(b) by 160 days.

(21) Appl. No.: 14/574,604

(22) Filed: Dec. 18, 2014

(65) Prior Publication Data

US 2015/0100234 A1  Apr. 9, 2015

Related U.S. Application Data

(63) Continuation of application No. PCT/EP2013/062620, filed on Jun. 18, 2013.

(30) Foreign Application Priority Data

Jun. 20, 2012 (DE) .................. 10 2012 210 375

(51) Int. Cl.
*G01C 21/36* (2006.01)

(52) U.S. Cl.
CPC ....... *G01C 21/365* (2013.01); *G01C 21/3635* (2013.01); *G01C 21/3697* (2013.01); *Y02T 10/84* (2013.01)

(58) Field of Classification Search
CPC ...... G02B 27/01; G01C 21/36; G01C 21/365; G01C 21/3635; B60R 1/00

(Continued)

(56) References Cited

U.S. PATENT DOCUMENTS 9,164,281 B2 * 10/2015 Hing .................. G02B 27/01
2004/0066376 A1 * 4/2004 Donath .................. B60R 1/00
345/169

(Continued)

FOREIGN PATENT DOCUMENTS

DE   10 2005 046 672 A1   4/2007
DE   10 2005 062 151 A1   7/2007

(Continued)

OTHER PUBLICATIONS

German Search Report dated Mar. 21, 2013, with English translation (nine (9) pages).

(Continued)

*Primary Examiner* — Thomas G Black
*Assistant Examiner* — Luke Huynh
(74) *Attorney, Agent, or Firm* — Crowell & Moring LLP

(57) ABSTRACT

Predefined route data for a driving route situated in front of the vehicle in the driving direction are provided. Further, at least one predefined predictive operating variable for the vehicle is provided. A three-dimensional model for a predefined environment of the vehicle is determined as a function of the route data. A graphic element is determined as a function of the three-dimensional model and of the at least one predictive operating variable. A head-up display of the vehicle has a predefined display field. The graphic element is displayed in the predefined display field. The graphic element is determined and displayed such that the graphic element is perceived by a viewer of the display field from a predefined viewing position with direct reference to the real environment of the vehicle.

9 Claims, 3 Drawing Sheets

(58) Field of Classification Search
USPC ............ 701/436, 36, 41, 532, 533; 340/436; 345/9
See application file for complete search history.

(56) References Cited

U.S. PATENT DOCUMENTS

| | | |
|---|---|---|
| 2006/0022811 A1 | 2/2006 | Haug |
| 2006/0066376 A1 | 3/2006 | Narendra et al. |
| 2009/0195414 A1 | 8/2009 | Riegel et al. |
| 2011/0052042 A1* | 3/2011 | Ben Tzvi ............... G06T 19/006 382/154 |
| 2011/0301813 A1* | 12/2011 | Sun ...................... B62D 15/029 701/41 |
| 2012/0191342 A1* | 7/2012 | Kang ................... G01C 21/365 701/423 |
| 2012/0224062 A1* | 9/2012 | Lacoste ................ G01C 21/365 348/148 |
| 2013/0181823 A1* | 7/2013 | Stahlin .................. B60K 35/00 340/436 |
| 2013/0187952 A1* | 7/2013 | Berkovich ................ G01S 5/16 345/633 |

FOREIGN PATENT DOCUMENTS

| | | |
|---|---|---|
| DE | 10 2007 058 295 A1 | 6/2009 |
| DE | 10 2009 027 026 A1 | 12/2010 |
| DE | 10 2010 040 803 A1 | 3/2012 |
| EP | 2 618 108 A1 | 7/2013 |

OTHER PUBLICATIONS

International Search Report (PCT/ISA/210) dated Sep. 12, 2013, with English translation (six (6) pages).

\* cited by examiner

METHOD AND DEVICE FOR OPERATING A HEAD-UP DISPLAY FOR A VEHICLE

CROSS REFERENCE TO RELATED APPLICATIONS

This application is a continuation of PCT International Application No. PCT/EP2013/062620, filed Jun. 18, 2013, which claims priority under 35 U.S.C. §119 from German Patent Application No. 10 2012 210 375.9, filed Jun. 20, 2012, the entire disclosures of which are herein expressly incorporated by reference.

BACKGROUND AND SUMMARY OF THE INVENTION

The invention relates to a method and a device for operating a head-up display for a vehicle.

In a motor vehicle, technical information, such as the current speed, the rotational speed of the engine or the oil temperature as well as traffic and navigation data are provided to the driver during the drive. The information is usually displayed on an instrument panel. While reading the displayed information from the instrument panel, a driver is at least briefly distracted from the traffic situation. Head-up displays make it possible to display information directly in the driver's visual range on the windshield of the vehicle. As a result, the information contents can be acquired, while the road conditions simultaneously remain in the driver's field of view.

Modern head-up displays generate a virtual image which, to the driver, seems to be situated at a defined distance in front of the windshield, for example, at the end of the engine hood.

It is an object of the invention to provide a method and a corresponding device for operating a head-up display for a vehicle, which method and device respectively contribute to improving a visualization of predictive information by use of the head-up display and thereby improving and/or simplifying a perception of the predictive information for a user of the head-up display.

This and other objects are achieved according to the invention.

The invention is distinguished by a method and a corresponding device for operating a head-up display of a vehicle. The head-up display has a predefined display field. Predefined route data for a driving route in front of the vehicle in a driving direction are provided. Furthermore, at least one predefined predictive operating variable is provided for the vehicle. As a function of the route data, a three-dimensional model for a given environment of the vehicle is determined. In addition, as a function of the three-dimensional model and of the at least one predictive operating variable, a graphic element is determined. The graphic element is displayed in the predefined display field, wherein the graphic element is determined and displayed such that the graphic element is perceived by a viewer of the display field, from a predefined viewing position, to have a direct relationship to the actual (real) environment of the vehicle.

The one or more predictive operating variables can be used for imaging an operating strategy of the vehicle and/or an operating instruction for the vehicle driver. Such an operating strategy may, for example, in each case, represent an idling mode, a coasting mode, a sail mode and/or a recuperation mode of the vehicle. The at least one predictive operating variable may, for example, represent a gas pedal position, a brake pedal position, a gear shift lever position, a vehicle speed and/or a drive torque.

This may advantageously contribute to improving a visualization of predictive information by use of the head-up display and thereby improving, and/or simplifying a perception of the predictive information by a user of the head-up display. The graphic element can be displayed in a contact-analogous manner. In the case of head-up displays, a differentiation is made between a contact-analogous and non-contact-analogous display. Contact analogous display types enrich the environment perceived by the driver by the overlaying of an artificially produced scenery. The information is displayed with a direct reference to the environment. An embedding and/or overlaying of the graphic element as virtual information into the actual environment perceived by the vehicle user makes it possible that the predictive character of the information can be perceived by the vehicle user in a simple, reliable and easily understandable manner.

The contact-analogous display makes it possible that a respective meaning of the thus signaled operating strategy for the vehicle and/or the operating instruction to the vehicle driver can be understood by the vehicle driver in a simpler and easier manner because the vehicle driver receives the predictive/anticipatory information with a direct reference to the environment perceived by him.

The provided route data for the driving route in front of the vehicle in the driving direction can be determined as a function of digital map data and/or a determined driving route for the vehicle. The at least one predefined predictive operating variable for the vehicle can be determined as a function of the determined route data.

In an advantageous embodiment, the environment model data provided for the predefined environment of the vehicle are provided, and the three-dimensional model is determined as a function of the environment model data. The environment model data can be determined as a function of acquired predefined environment data. The environment model data can advantageously be utilized for very precisely determining the three-dimensional model.

In a further advantageous embodiment, the at least one predictive operating variable is determined as a function of at least one current additional operating variable and/or at least one determined current environment variable. This has the advantage that current traffic occurrences, such as vehicles driving ahead, people, animals, snow, and/or black ice, and so on, can be taken into account for determining the at least one predictive operating variable. The operating variable and the additional operating variable may be identical or different. The vehicle may have at least one environment sensor which is designed for acquiring environment data that are representative of the at least one environment variable. The environment sensor may have an image acquisition unit and/or a radar sensor and/or an ultrasound sensor.

In a further advantageous embodiment, a control signal is acquired which is generated in response to the graphic element in the display field and which is representative of a predefined actuation of a predefined operating element in the vehicle interior. As a function of the acquired control signal and the three-dimensional model, a second graphic element is determined and is displayed in the predefined display field. The second graphic element is determined and displayed such that the second graphic element is perceived by the viewer of the display field, from the predefined viewing position, with direct reference to the real environment of the vehicle. This advantageously permits the evaluating of a vehicle driver's reaction to the representation in the head-up display and, as required, signaling a changed operating strategy and/or operating instruction.

In a further advantageous embodiment, a predefined position of at least one predefined object is provided. As a function of the three-dimensional model and the determined position of the object, a third graphic element is determined and is indicated in the predefined display field. The third graphic element is determined and displayed such that the third graphic element is perceived by the viewer of the display field, from the predefined viewing position, with direct reference to the real environment of the vehicle. The position of the present object can be determined as a function of acquired environment data and/or digital map data. This advantageously permits the simplification of maneuvering, parking and/or driving operations for the vehicle driver. The maneuvering, parking and/or driving situation can be displayed to the vehicle driver in direct reference to the environment of the vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

In all figures, elements of the same construction or function are provided with identical reference numbers.

Figure 1:
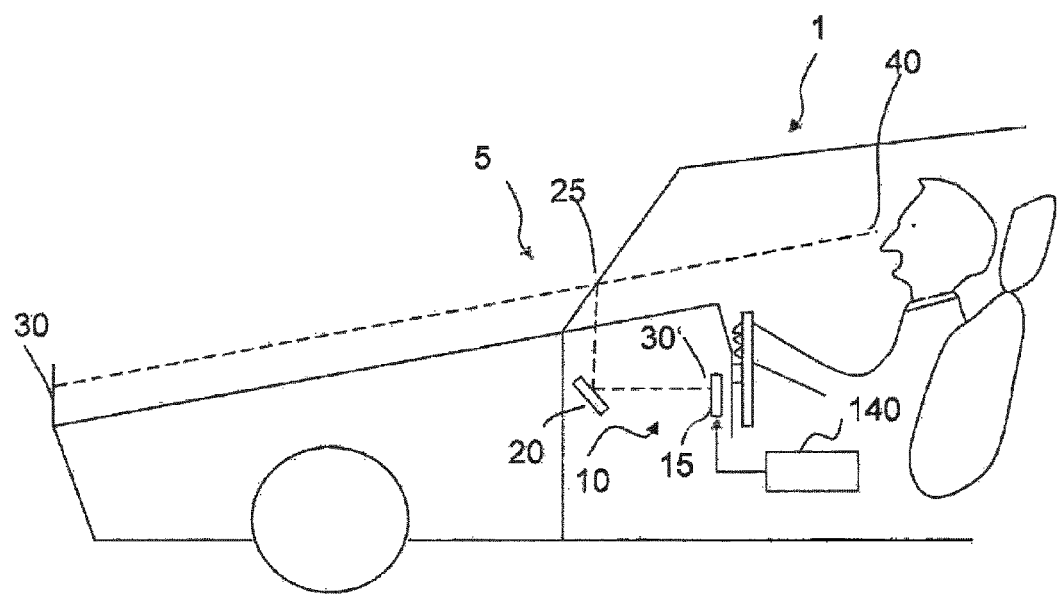
FIG. 1 is a schematic representation of a head-up display of a vehicle.

FIG. 1 illustrates an embodiment of a head-up display 5 for a vehicle 1, particularly an automobile. The head-up display 5 includes an image-producing device 10 for producing a virtual image 30. The image-producing device 10 includes a display 15 for producing a real image 30' and an optical device for producing a virtual image 30. The optical device includes first 20 and second 25 imaging mirrors 25. A real image 30' produced by the display 15 is first directed onto the first mirror 20 and is projected by the first mirror 20 onto the second mirror 25. The second mirror 25 may be designed as a windshield 320 of a vehicle 1.

From a driver's predefined eye box 40, the virtual image 30 appears at a distance in front of the windshield 320, for example, at the end of the engine hood. Generally, the virtual image 30 can be seen only from a defined area, the so-called eye box 40. The eye box 40 is usually designed such that the complete virtual image 30 can be seen from the entire desired eye box area.

Static display contents, which are permanently or frequently displayed, may be represented in the virtual image 30. Furthermore, the image-producing device 10 may be designed such that image contents are displayed in the virtual image 30 only according to the situation and for a short time. The head-up display 5 may particularly be constructed as a contact-analogous head-up display 5. In the case of head-up displays 5, a differentiation is made between a contact-analogous and non-contact-analogous representation. Contact-analogous representation forms enrich the environment perceived by the driver by overlaying an artificially produced scenery. In contrast, non-contact analogous representation forms represent information without any direct reference to the environment.

Figure 2:
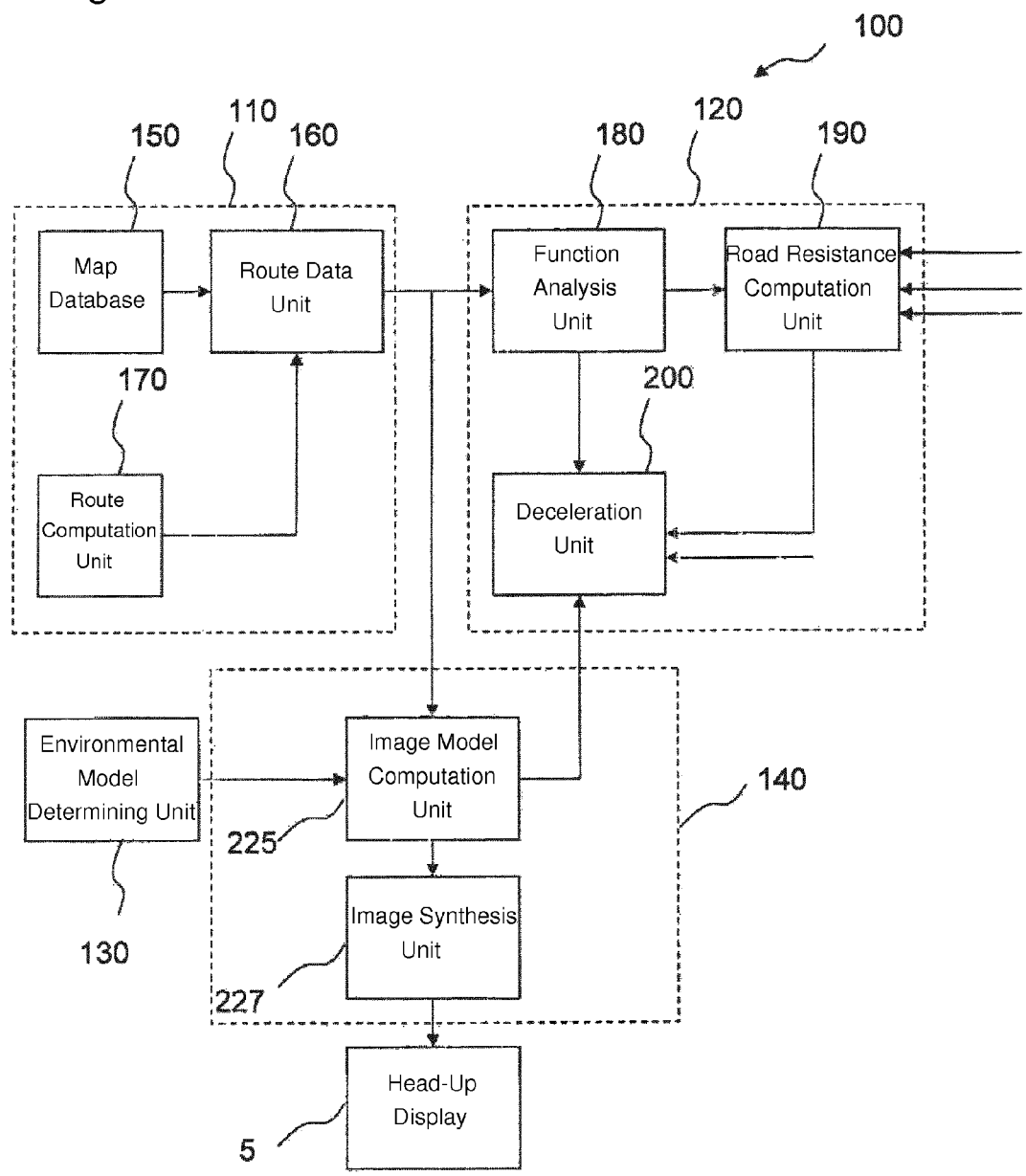
FIG. 2 is a block diagram of an embodiment of a driver assistance system.

FIG. 2 illustrates an embodiment of a driver assistance system 100. The driver assistance system 100 has, for example, a deceleration assistant. For example, it is an object of the driver assistance system 100 to assist the vehicle driver during anticipatory driving, particularly, in an anticipatory fashion, to signal the driver concerning a deceleration of the vehicle 1, so that the kinetic energy of the vehicle 1 can be utilized as optimally as possible and a fuel and/or energy consumption of the vehicle 1 can be reduced. The anticipation assistant takes into account the deceleration behavior of the vehicle 1 on the basis of current operating variables of the vehicle 1 and of the course of the road. For example, when a deceleration situation is active, a predefined operating instruction is preferably signaled to the driver for the deceleration of the vehicle 1. Furthermore, additional control devices of the vehicle 1 are appropriately triggered for controlling defined efficient operating strategies, such as a recuperation.

The driver assistance system 100 includes, for example, a first control unit 110, a second control unit 120, a third control unit 130, the head-up display 5 and a device 140 for operating the head-up display 5. The head-up display 5 has, for example, the image-producing device 10 and the optical system (see FIG. 1).

The first control unit 110 may, for example, have a navigation unit which comprises, for example, a map database 150, a route computation unit 170 and a route data unit 160. The route data unit 160 may be designed for determining route data for the driving route situated in front of the vehicle 1 in the driving direction, as a function of digital map data and/or a determined driving route for the vehicle 1. Route data are, for example, differences in altitude, courses of the route, particularly straight or winding roads, or other landscape geometries. Furthermore, traffic signs can be analyzed from the map data. The route data unit 160 may, for example, comprise a route optimization program for obtaining route data for assisting anticipatory driving.

The route data, such as differences in altitude, courses of the route, narrow turns, turn-offs and predefined traffic signs for speed limits or towns, are transmitted by the first control unit 110, for example, to the second control unit 120. The second control unit 120 may, for example, include the deceleration assistant. The second control unit 120 includes, for example, a function block 180, a deceleration unit 200 and a road resistance computation unit 190. The route data supplied to the function block 180 are processed in the function block 180 for the analysis of speeds and distances. The result of the analysis in the function block 180 is supplied to a deceleration unit 200. Furthermore, the function block 180 forwards the slope from the route data as an input signal to a road resistance computation unit 190. Additional input signals, for example, may be supplied to the road resistance computation unit 190, which input signals represent current operating variables of the vehicle 1, such as a drive torque, a vehicle speed or a sail status.

The road resistance computation unit 190 computes, for example, the currently conceivable deceleration as a function of the current vehicle operating variables and the slope. The resulting deceleration course is supplied by the driving resistance computation unit 190 also to the deceleration unit 200.

The deceleration unit 200 is, for example, designed for determining a predictive operating variable for the vehicle 1 as a function of the route data. The predictive operating variable may represent, for example, a route-dependent course of an accelerator position and/or a point-in-time or a route point, as of which, in the coasting operation, a rolling can take place to a reduced target speed situated ahead. Also in the case of an existing ECO driving mode switch, the deceleration unit 200 may analyze a status of this switch (open arrow to the deceleration unit 200) as information.

The third control unit 130 is, for example, designed for determining an environment model. For this purpose, the third control unit 130 is, for example, designed to determine environment model data as a function of the acquired environment data, which environment model data represent a predefined environment of the vehicle 1. The third control unit 130 is, for example, coupled in a signal-related manner with one or more sensor units. The respective sensor units are designed for acquiring environment data of the vehicle 1. The respective sensor unit may have an optical acquisition device, for example, a video camera, a radar sensor, an ultrasound sensor and/or a Lidar sensor.

The environment model data, the determined route data of the first control unit 110 as well as the at least one predictive operating variable determined by the deceleration unit 200 are transmitted to the device 140 for operating the head-up display 5.

The device 140 is constructed for providing, for example, for receiving and reading-in the route data for a driving route situated in front of the vehicle 1 in the driving direction and the at least one predefined predictive operating variable.

The device 140 is constructed for determining a three-dimensional model for a predefined environment of the vehicle as a function of the provided route data. The device 140 is constructed for determining a graphic element 300 as a function of the three-dimensional model and of the at least one predictive operating variable and displaying the graphic element 300 on a predefined display field 310 of the head-up display 5, the graphic element 300 being determined and displayed such that the graphic element 300 is perceived by a viewer of the display field 310 from a predefined viewing position with direct reference to the real environment of the vehicle 1.

As an alternative or in addition, it is contemplated that the device 140 for operating the head-up display 5 is constructed for determining the route data for the driving route situated in front of the vehicle in the driving direction as a function of the digital map data and/or the determined driving route for the vehicle 1, and/or determining the at least one predictive operating variable for the vehicle 1 as a function of the determined route data.

Furthermore, the device 140 may, for example, be designed for determining the at least one predictive operating variable as a function of at least one current additional operating variable and/or at least one determined current environment variable.

The device 140 is, for example, further designed for providing the environment model data for the predefined environment of the vehicle, for example, by receiving and reading-in, and for determining the three-dimensional model as a function of the environment model data.

As an alternative and in addition, it is contemplated that the device 140 for operating the head-up display 4 is designed for determining the environment model data as a function of the acquired environment data.

The environment variable may, for example, represent a distance from a vehicle 1 driving ahead and/or another object that is participating in the traffic. As an alternative or in addition, the environment variable may represent an outside temperature and/or precipitation (rain, snow, fog).

The current operating variable may, for example, represent a current speed and/or a current accelerator position, and so on.

The device 140 is, for example, designed for determining, as a function of the environment model data, the route data and the at least one operating variable, a three-dimensional scene, which represents a virtual spatial model. The virtual spatial model defines, for example, objects and their material characteristics, light sources as well as a viewer's position and viewing direction. For this purpose, the device may, for example, comprise an image model computation unit 225.

The device 140 comprises, for example, an image synthesis unit 227, also called rendering unit, which is designed for determining objects visible to a virtual viewer, determining an appearance of surfaces influenced by their material characteristics, and computing a light distribution within the scene.

A digital image with predefined pixels determined in such a manner is transmitted to the image-producing device 10 of the head-up display 5.

Figure 3:
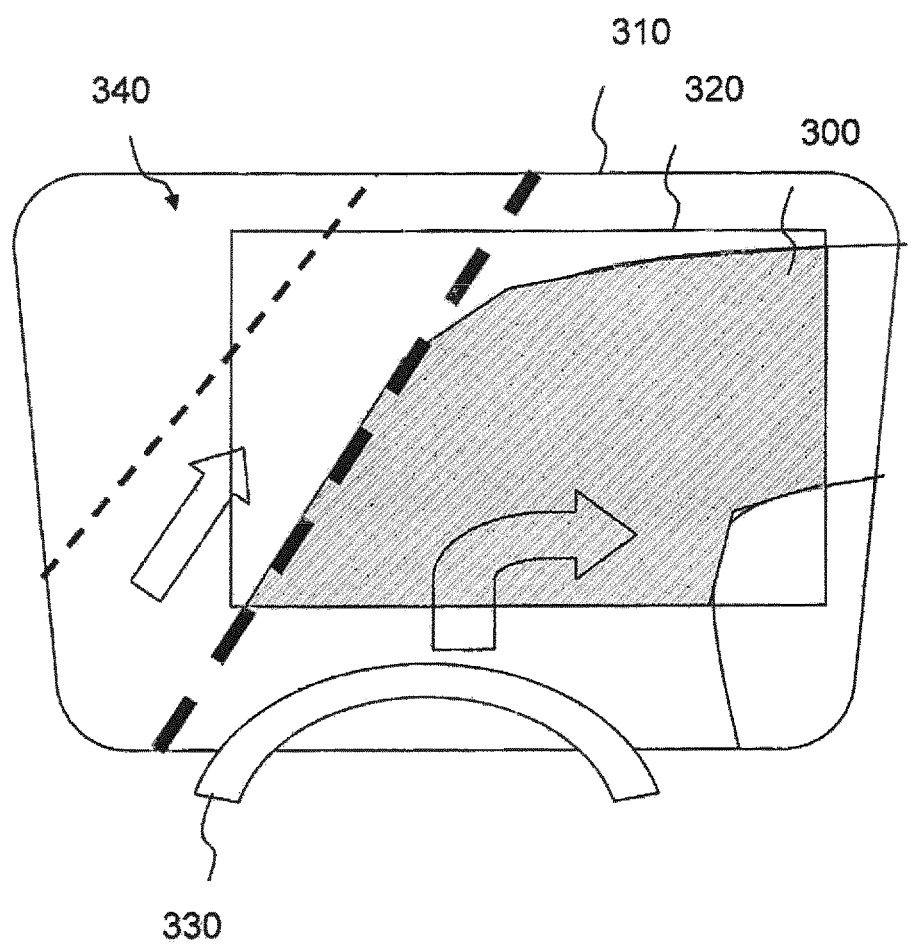
FIG. 3 is an example of a contact-analogous display on a windshield of a vehicle.

FIG. 3 illustrates an example of the display field 310 on a windshield 320 of the vehicle 1. The graphic element 300 is displayed in the display field 310. In the example illustrated in FIG. 3, the graphic element 300 is displayed such that the viewer perceives the real road marked in color in front of the vehicle.

As a function of the at least one operating variable or as a function of the operating strategy and/or operating instruction, which is imaged by the at least one operating variable, the graphic element 300 can be determined and displayed such that the viewer, particularly the vehicle driver, perceives the real road predefined marked in color in front of the vehicle 1. A predefined operating instruction may be assigned to the respective color of the road marking For example, the operating instruction "brake hard" may be assigned to the color red and/or for example, the operating instruction "remove foot from accelerator" may be assigned to the color yellow.

The vehicle driver can experience such a display of the operating strategy and/or operating instruction more intuitively and more directly. The marking of a driving route situated ahead permits the vehicle driver to receive a prediction of the operating strategy and/or operating instruction on the basis of his current way of driving. In the case of a hybrid vehicle, the vehicle driver can be prepared for the event that an internal-combustion engine will shortly be started. In the case of an electric vehicle, the vehicle driver can be prepared for the event that the electric motor will soon be started or stopped.

As an alternative or in addition, the at least one graphic element 300 may have one or more milestones which are determined and displayed such that the viewer can perceive the milestones as a component of and with direct reference to the real environment of the vehicle 1.

In addition or as an alternative, it is contemplated to indicate with the graphic element 300 in the predefined display field 310 of the head-up display 5, a predefined drive-in area of an environmental zone, for example a zone in which travel should not occur with use of an operated internal-combustion engine. The viewer may perceive the predefined drive-in area in a predefined color-coded manner. It may, for example, be provided that the graphic element 300 is indicated such that the viewer perceives a predefined route section in the drive-in area of the environment zone in a predefined color-coded manner.

It may further be provided that the display is, in each case, adapted as a function of how a vehicle driver reacts to the display, which represents, for example, an operating strategy for the vehicle 1 and/or an operating instruction for the vehicle driver. For this purpose, the device 140 may be designed for acquiring a control signal generated in response to the display of the graphic element 300 in the display field 310. The control signal is, for example, representative of a predefined actuation of a predefined operating element in the vehicle interior. It may therefore, for example, be representative of an acceleration of the vehicle 1. As a function of the acquired control signal and the three-dimensional model, a second graphic element is determined and displayed in the predefined display field 310, the second graphic element being determined and displayed such that the second graphic element is perceived by the viewer of the display field 310 from the predefined viewing position with direct reference to the real environment of the vehicle 1. Here, it may, for example, be provided that the second graphic element is determined and displayed such that the viewer will perceive the real road in front of the vehicle 1 in a flashing color.

For assisting an energy-saving driving mode, it may further be provided that, as a function of the driver's way of driving, at least one fourth graphic element is determined and displayed which, for example, represents a reward point. Here, the display will take place such that the fourth graphic element is perceived by the viewer of the display field 310 from the predefined viewing position as stars which seem to be situated on a route in front of the vehicle. In a supplementary fashion, it may be provided that, when driving over such a star, an acoustic or visual signal is emitted.

It may further be provided that the device 140 is designed for providing a predefined position of at least one predefined object and, as a function of the three-dimensional model and of the determined position of the object, determining a third graphic element and displaying it in the predefined display field 310, the third graphic element being determined and displayed such that the third graphic element is perceived by the viewer of the display field 310 from the predefined viewing position with direct reference to the real environment of the vehicle 1.

This makes it possible, for example, to determine and display in a contact-analogous manner a position of an inductive charging station in order to thereby assist the vehicle driver in taking up a correct position above the charging station. In particular, the charging station may comprise a charging coil integrated in a road. A predefined graphic symbol may be assigned to the charging station. The third graphic element may, for example, represent the graphic symbol. In this case, the display in the predefined display field comprises, for example, the graphic element 300 in a supplementary manner, which represents, for example, a recommendation to act.

The position of the predefined object may, for example, be determined as a function of acquired environment data and/or of digital map data. It may be provided that the position for the predefined object is, for example, determined by the first control unit 110 and/or by the second control unit 120. As an alternative or in addition, it is contemplated that the device 140 is designed for determining the position of the predefined object.

In an alternative embodiment of the device 140 for operating the head-up display 5, the device 140 may be designed for providing, independently of the at least one predictive operating variable, the predefined position at least of the predefined object, and as a function of the three-dimensional model and the determined position of the object, for determining the third graphic element and displaying it in the predefined display field 310.

LIST OF REFERENCE NUMBERS

1 Vehicle
5 Head-up display
10 Image-producing device
15 Display
20 First mirror
25 Second mirror
30 Virtual image
30' Real image
40 Eye box
100 Driver assistance system
110 First control unit
120 Second control unit
130 Third control unit
140 Device for operating a head-up displays
150 Map data bank
160 Route data unit
170 Route computation unit
180 Function block
190 Road resistance computation unit
200 Deceleration unit
225 Image model computation unit
227 Image synthesis unit
300 Graphic element
310 Display field
320 Windshield
330 Steering wheel
340 Real environment of vehicle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a head-up display of a vehicle, the head-up display having a predefined display field, the method comprising the acts of:
    providing predefined route data for a driving route situated in front of the vehicle in a driving direction;
    providing at least one predefined predictive operating variable for the vehicle;
    determining a three-dimensional model for a predefined environment of the vehicle as a function of the provided predefined route data;
    determining a graphic element as a function of the three-dimensional model and the predefined predictive operating variable; and
    displaying the determined graphic element in the predefined display field, wherein the graphic element is, from a predefined viewing position, perceived by a viewer of the display field with direct reference to an actual environment of the vehicle;
    acquiring a control signal generated in response to the displaying of the graphic element in the predefined display field, said control signal being representative of a predefined actuation of an operating element in an interior of the vehicle; and
    as a function of the acquired control signal and the determined three-dimensional model, determining a second graphic element; and
    displaying the second graphic element in the predefined display field, wherein the second graphic element is, from the predefined viewing position, perceived by the viewer with direct reference to the actual environment of the vehicle.

2. The method according to claim 1, further comprising the acts of:

providing environment model data predefined for the predefined environment of the vehicle, wherein the determining of the three-dimensional model is carried out as a function of the provided environment model data.

3. The method according to claim 2, further comprising the act of:

determining the at least one predefined predictive operating variable that is provided as a function of at least one current additional operating variable and/or at least one determined current environment variable.

4. The method according to claim 1, further comprising the act of:

determining the at least one predefined predictive operating variable that is provided as a function of at least one current additional operating variable and/or at least one determined current environment variable.

5. The method according to claim 1, further comprising the acts of:

providing a predefined position of at least one predefined object; and as a function of the provided predefined position and the determined three-dimensional model, determining a third graphic element; and displaying the third graphic element in the predefined display field, wherein the third graphic element is, from the predefined viewing position, perceived by the viewer of the display field with direct reference to the actual environment of the vehicle.

6. The method according to claim 1, further comprising the acts of:

providing a predefined position of at least one predefined object; and as a function of the provided predefined position and the determined three-dimensional model, determining a third graphic element; and displaying the third graphic element in the predefined display field, wherein the third graphic element is, from the predefined viewing position, perceived by the viewer of the display field with direct reference to the actual environment of the vehicle.

7. A method of operating a head-up display of a vehicle, the head-up display having a predefined display field, the method comprising the acts of:

providing predefined route data for a driving route situated in front of the vehicle in a driving direction;

providing at least one predefined predictive operating variable for the vehicle;

determining a three-dimensional model for a predefined environment of the vehicle as a function of the provided predefined route data;

determining a graphic element as a function of the three-dimensional model and the predefined predictive operating variable;

displaying the determined graphic element in the predefined display field, wherein the graphic element is, from a predefined viewing position, perceived by a viewer of the display field as an enhanced feature of an actual environment of the vehicle;

providing a predefined position of at least one predefined object;

as a function of the provided predefined position and the determined three-dimensional model, determining an additional graphic element; and displaying the additional graphic element in the predefined display field, wherein the additional graphic element is, from the predefined viewing position, perceived by the viewer of the display field with direct reference to the actual environment of the vehicle.

8. A device for operating a head-up display of a vehicle, the head-up display having a predefined display field, the device comprising:

a control unit configured to receive predefined route data for a driving route situated in front of the vehicle in a driving direction, at least one predefined predictive operating variable for the vehicle, and a three-dimensional model determined for a predefined environment of the vehicle as a function of the provided route data; and wherein the control unit is operatively configured to execute a program to:

determine a graphic element as a function of the three-dimensional model and the predefined predictive operating variable;

display the determined graphic element in the predefined display field, wherein the graphic element is, from a predefined viewing position, perceived by a viewer of the display field as an enhanced feature of an actual environment of the vehicle;

acquire a control signal generated in response to the displaying of the graphic element in the predefined display field, said control signal being representative of a predefined actuation of an operating element in an interior of the vehicle;

as a function of the acquired control signal and the determined three-dimensional model, determine a second graphic element; and display the second graphic element in the predefined display field, wherein the second graphic element is, from the predefined viewing position, perceived by the viewer with direct reference to the actual environment of the vehicle.

9. The device according to claim 8, wherein the control unit is further configured to receive a predefined position of at least one predefined object, the control unit further executing a program to:

as a function of the provided predefined position and the determined three-dimensional model, determine a third graphic element; and display the third graphic element in the predefined display field, wherein the third graphic element is, from the predefined viewing position, perceived by the viewer of the display field with direct reference to the actual environment of the vehicle.

* * * * *